Figure 1:
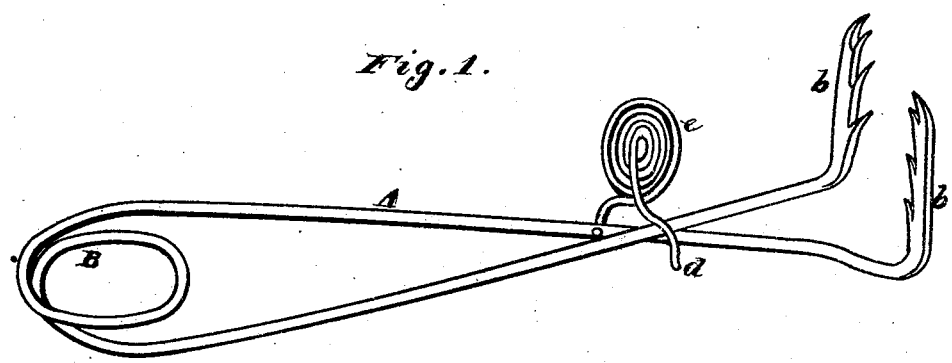

R. S. PARDEE.
Animal-Traps.

No. 152,506. Patented June 30, 1874.

Witnesses
Geo. H. Strong,
C. M. Richardson

Inventor
Richard S. Pardee
By his atty's
Dewey & Co.

UNITED STATES PATENT OFFICE.

RICHARD S. PARDEE, OF SAN DIEGO, CALIFORNIA.

IMPROVEMENT IN ANIMAL-TRAPS.

Specification forming part of Letters Patent No. 152,506, dated June 30, 1874; application filed April 15, 1874.

*To all whom it may concern:*

Be it known that I, RICHARD S. PARDEE, of San Diego city and county, State of California, have invented an Improved Gopher-Trap; and I do hereby declare the following description and accompanying drawings are sufficient to enable any person skilled in the art or science to which it most nearly appertains to make and use my said invention or improvement without further invention or experiment.

My invention relates to a simple, cheap, and effective gopher-trap.

In order to describe my improved trap reference is had to the accompanying drawing forming a part of this specification, in which—

Figure 1 is a perspective view of my trap.

A represents a piece of strong wire which is coiled into a spring, B, at its middle, so that its two ends form spring-arms. I then flatten about two inches in length at the end of each arm, and, after crossing the ends, I bend these flattened portions $b$ in the same direction at right angles to the main portion of the wire, so that the energy of the spring will press the two opposing edges of the flattened portion together, and thus provide the jaws of the trap. The meeting edges of these jaws I then provide with teeth by cutting into them at an angle with a suitable cutter, and turning the points thus formed outward, as shown.

The trigger $d$ and trip-plate $e$ I form in one piece, out of a single piece of wire, as follows: One end of the piece of wire is passed through a hole in one spring, and at the proper distance from the jaw, and a head formed on the end to prevent it from coming out. I then bend the wire upward and form it into a circular coil, winding it to the center so as to form a circular plate of coils. The inner end of the wire I then carry down and bend it around the opposite end, from which it is carried to the outside of the main wire, and slightly below it, where it terminates to form the trigger $d$.

To set the trap, the coil is turned down and the spring-arms pressed across each other against the spring B until the trigger $d$ passes over the opposite spring-arm. The coil or trigger plate is then raised to a position at right angles to the crossed arms, so as to bring the trigger $d$ between the arms, and thus hold them in their position. Now, when the trap is placed in position at the end of a gopher-hole and the animal attempts to close the opening, the slightest pressure of the earth which the gopher moves in front of him against the trip-plate $e$ will release the catch or trigger, and the gopher will be caught by the closing jaws.

Having thus described my invention, what I claim, and desire to secure by Letters Patent, is—

The wire A, with its middle coil or spring B, and having the ends of the spring-arm crossed, flattened, and toothed, as above described, in combination with the trip-plate $d$ and trigger-catch $e$, formed of a single wire, substantially as and for the purpose above described.

In witness whereof I hereunto set my hand and seal.

RICHARD S. PARDEE. [L. S.]

Witnesses:
JACOB HOKE,
L. SCOTT.